United States Patent
Morell et al.

[11] Patent Number: 6,132,051
[45] Date of Patent: Oct. 17, 2000

[54] MIRROR ATTACHMENT

[76] Inventors: Kenneth Morell; Renee Morell, both of 2751 W. Bay City Forestville Rd., Ubly, Mich. 48475

[21] Appl. No.: 09/204,449

[22] Filed: Dec. 3, 1998

[51] Int. Cl.⁷ ..................................................... B60R 1/06
[52] U.S. Cl. ..................... 359/844; 359/838; 359/850; 359/864; 359/865; 359/872; 359/876; 248/476; 248/479; 248/481; 248/484
[58] Field of Search .................................. 359/842, 850, 359/854, 864, 865, 871, 872, 875, 881, 844, 876, 838; 248/481, 484, 549, 900, 231.51, 479, 476

[56] References Cited

U.S. PATENT DOCUMENTS

| | | | |
|---|---|---|---|
| 564,454 | 7/1896 | Ryan | 359/842 |
| 3,515,365 | 6/1970 | Jones et al. | 359/872 |
| 3,544,259 | 12/1970 | Fujita | 248/549 |
| 3,848,838 | 11/1974 | Thomas | 248/541 |
| 3,858,966 | 1/1975 | Lowell, Jr. | 359/881 |
| 4,486,075 | 12/1984 | Cohen | 359/865 |
| 4,624,539 | 11/1986 | King et al. | 359/872 |
| 4,730,914 | 3/1988 | Stout | 359/872 |
| 4,802,751 | 2/1989 | Ueng | 359/865 |
| 4,852,986 | 8/1989 | Yu | 248/476 |
| 5,076,701 | 12/1991 | Grennlaw | 359/871 |
| 5,148,327 | 9/1992 | Gaxiola, Jr. | 359/881 |
| 5,487,522 | 1/1996 | Hook | 248/549 |
| 5,946,149 | 8/1999 | Hoffman | 359/872 |

FOREIGN PATENT DOCUMENTS

| | | | |
|---|---|---|---|
| 2838525 | 3/1980 | Germany | 359/865 |

*Primary Examiner*—Cassandra Spyrou
*Assistant Examiner*—John Juba, Jr.

[57] ABSTRACT

A mirror attachment for attachment to a rearview mirror of a vehicle to enhance a user's view behind the user. The mirror attachment includes a mirror member with front and back faces. The back face of the mirror member has a light reflecting mirrored surface. A pair of shafts are provided each having a pair of opposite ends. A first of the ends of a first of the shafts is pivotally coupled to the front face of the mirror member. A second of the ends of the first shaft is pivotally coupled to a first of the ends of a second of the shafts. A clamp member is provided having a pair of arms. A second of the ends of the second shaft is pivotally coupled to the clamp member.

8 Claims, 4 Drawing Sheets

MIRROR ATTACHMENT

BACKGROUND OF THE INVENTION

1. Field of the Invention

The present invention relates to mirror attachment for attachment to a rearview mirror of a vehicle and more particularly pertains to a new mirror attachment for attachment to a rearview mirror of a vehicle to enhance a user's view behind the user.

2. Description of the Prior Art

The use of mirror attachment for attachment to a rearview mirror of a vehicle is known in the prior art. More specifically, mirror attachment for attachment to a rearview mirror of a vehicle heretofore devised and utilized are known o consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,906,088 by Casey; U.S. Pat. No. 4,802,751 by Ueng; U.S. Pat. No. 4,832,476 by Gabrielyan; U.S. Pat. No. Des. 307,678 by Lookerse; U.S. Pat. No. 4,793,701 by Brown; and U.S. Pat. No. 5,748,395 by Rendi, Jr.

While these devices fulfill their respective, particular objectives and requirements, the aforementioned patents do not disclose a new mirror attachment. The inventive device includes a mirror member with front and back faces. The back face of the mirror member has a light reflecting mirrored surface. A pair of shafts are provided each having a pair of opposite ends. A first of the ends of a first of the shafts is pivotally coupled to the front face of the mirror member. A second of the ends of the first shaft is pivotally coupled to a first of the ends of a second of the shafts. A clamp member is provided having a pair of arms. A second of the ends of the second shaft is pivotally coupled to the clamp member.

In these respects, the mirror attachment according to the present invention substantially departs from the conventional concepts and designs of the prior art, and in so doing provides an apparatus primarily developed for the purpose of attachment to a rearview mirror of a vehicle to enhance a user's view behind the user.

SUMMARY OF THE INVENTION

In view of the foregoing disadvantages inherent in the known types of mirror attachment for attachment to a rearview mirror of a vehicle now present in the prior art, the present invention provides a new mirror attachment construction wherein the same can be utilized for attachment to a rearview mirror of a vehicle to enhance a user's view behind the user.

The general purpose of the present invention, which will be described subsequently in greater detail, is to provide a new mirror attachment apparatus and method which has many of the advantages of the mirror attachment for attachment to a rearview mirror of a vehicle mentioned heretofore and many novel features that result in a new mirror attachment which is not anticipated, rendered obvious, suggested, or even implied by any of the prior art mirror attachment for attachment to a rearview mirror of a vehicle, either alone or in any combination thereof.

To attain this, the present invention generally comprises a mirror member with front and back faces. The back face of the mirror member has a light reflecting mirrored surface. A pair of shafts are provided each having a pair of opposite ends. A first of the ends of a first of the shafts is pivotally coupled to the front face of the mirror member. A second of the ends of the first shaft is pivotally coupled to a first of the ends of a second of the shafts. A clamp member is provided having a pair of arms. A second of the ends of the second shaft is pivotally coupled to the clamp member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new mirror attachment apparatus and method which has many of the advantages of the mirror attachment for attachment to a rearview mirror of a vehicle mentioned heretofore and many novel features that result in a new mirror attachment which is not anticipated, rendered obvious, suggested, or even implied by any of the prior art mirror attachment for attachment to a rearview mirror of a vehicle, either alone or in any combination thereof.

It is another object of the present invention to provide a new mirror attachment which may be easily and efficiently manufactured and marketed.

It is a further object of the present invention to provide a new mirror attachment which is of a durable and reliable construction.

An even further object of the present invention is to provide a new mirror attachment which is susceptible of a low cost of manufacture with regard to both materials and labor, and which accordingly is then susceptible of low prices of sale to the consuming public, thereby making such mirror attachment economically available to the buying public.

Still yet another object of the present invention is to provide a new mirror attachment which provides in the apparatuses and methods of the prior art some of the advantages thereof, while simultaneously overcoming some of the disadvantages normally associated therewith.

Still another object of the present invention is to provide a new mirror attachment for attachment to a rearview mirror of a vehicle to enhance a user's view behind the user.

Yet another object of the present invention is to provide a new mirror attachment which includes a mirror member with front and back faces. The back face of the mirror member has a light reflecting mirrored surface. A pair of shafts are provided each having a pair of opposite ends. A first of the ends of a first of the shafts is pivotally coupled to the front face of the mirror member. A second of the ends of the first shaft is pivotally coupled to a first of the ends of a second of the shafts. A clamp member is provided having a pair of arms. A second of the ends of the second shaft is pivotally coupled to the clamp member.

Still yet another object of the present invention is to provide a new mirror attachment that provides an additional rearview mirror that may be positioned at an angle so that the user may better view blind spots behind the user's vehicle.

Even still another object of the present invention is to provide a new mirror attachment that may be positioned to permit a user to view into a back seat region of the vehicle so that the user, such as a parent, may keep an eye on passengers, such as children, while driving the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
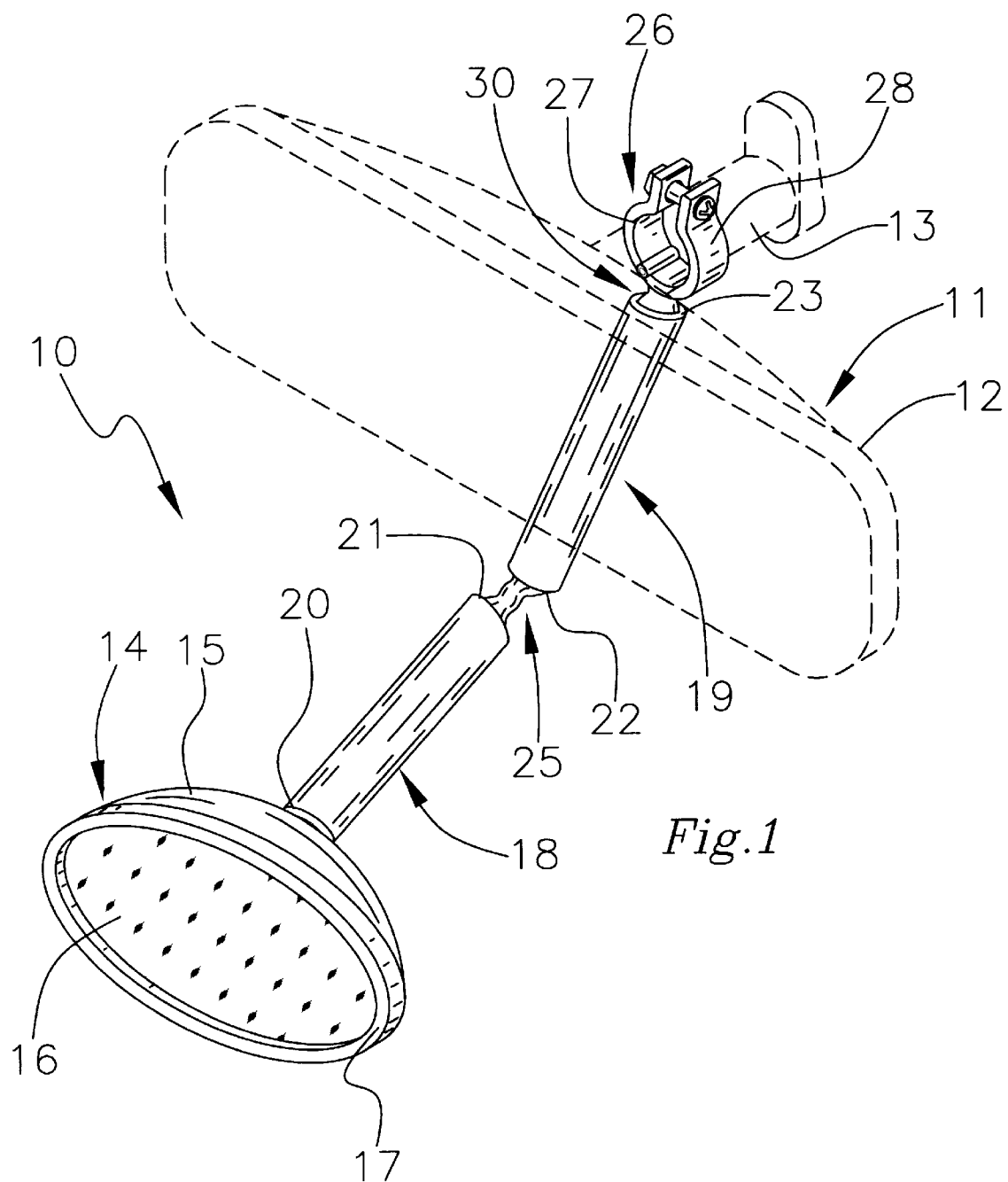
FIG. 1 is a schematic perspective view of a new mirror attachment attached to the mounting stem of a rearview mirror according to the present invention.

With reference now to the drawings, and in particular to FIGS. 1 through 4 thereof, a new mirror attachment embodying the principles and concepts of the present invention and generally designated by the reference numeral 10 will be described.

As best illustrated in FIGS. 1 through 4, the mirror attachment 10 generally comprises a mirror member with front and back faces. The back face of the mirror member has a light reflecting mirrored surface. A pair of shafts are provided each having a pair of opposite ends. A first of the ends of a first of the shafts is pivotally coupled to the front face of the mirror member. A second of the ends of the first shaft is pivotally coupled to a first of the ends of a second of the shafts. A clamp member is provided having a pair of arms. A second of the ends of the second shaft is pivotally coupled to the clamp member.

In closer detail, the mirror attachment 10 is designed for attachment to a rearview mirror 11 of a vehicle mounted to a front windshield of the vehicle to permit viewing by the driver of an area behind the vehicle. The rearview mirror typically comprises a generally rectangular mirrored portion 12 pivotally coupled to a mounting stem 13. The mounting stem is attached to an inside surface of the front windshield.

Specifically, the mirror attachment includes a generally dome-shaped mirror member 14 having a center, arcuate front and back faces 15,16, and a peripheral edge 17. The front face 15 of the mirror member is generally convex in shape while the back face 16 of the mirror member is generally concave in shape. The back face of the mirror member has a light reflecting mirrored surface to permit viewing of a reflected image by a user looking at the back face of the mirror member. Preferably, the peripheral edge of the mirror member is generally oval in shape. Optionally, the peripheral edge of the mirror member may be generally circular in shape. In an ideal illustrative embodiment, the peripheral edge of the mirror member has an outer diameter of about 2 inches. In this ideal illustrative embodiment, the mirror member has a depth defined between the plane of the peripheral edge and the front face at the center of the mirror member of about 1 inch.

The attachment also includes a pair of generally cylindrical elongate shafts 18,19 each having a pair of opposite ends 20,21,22,23 and a longitudinal axis extending between the ends of the respective shaft. The shafts each has a length defined between the ends of the respective member. Preferably, the lengths of the shafts are about equal to one another. In the ideal illustrative embodiment, the lengths of the shafts are each about 2 inches.

A first of the ends 20 of a first of the shafts 18 is pivotally coupled to the front face of the mirror member at the center of the mirror member by a first universal pivot joint 24. A second of the ends 21 of the first shaft is pivotally coupled to a first of the ends 22 of a second of the shafts 19 by a second universal pivot joint 25.

Figure 2:
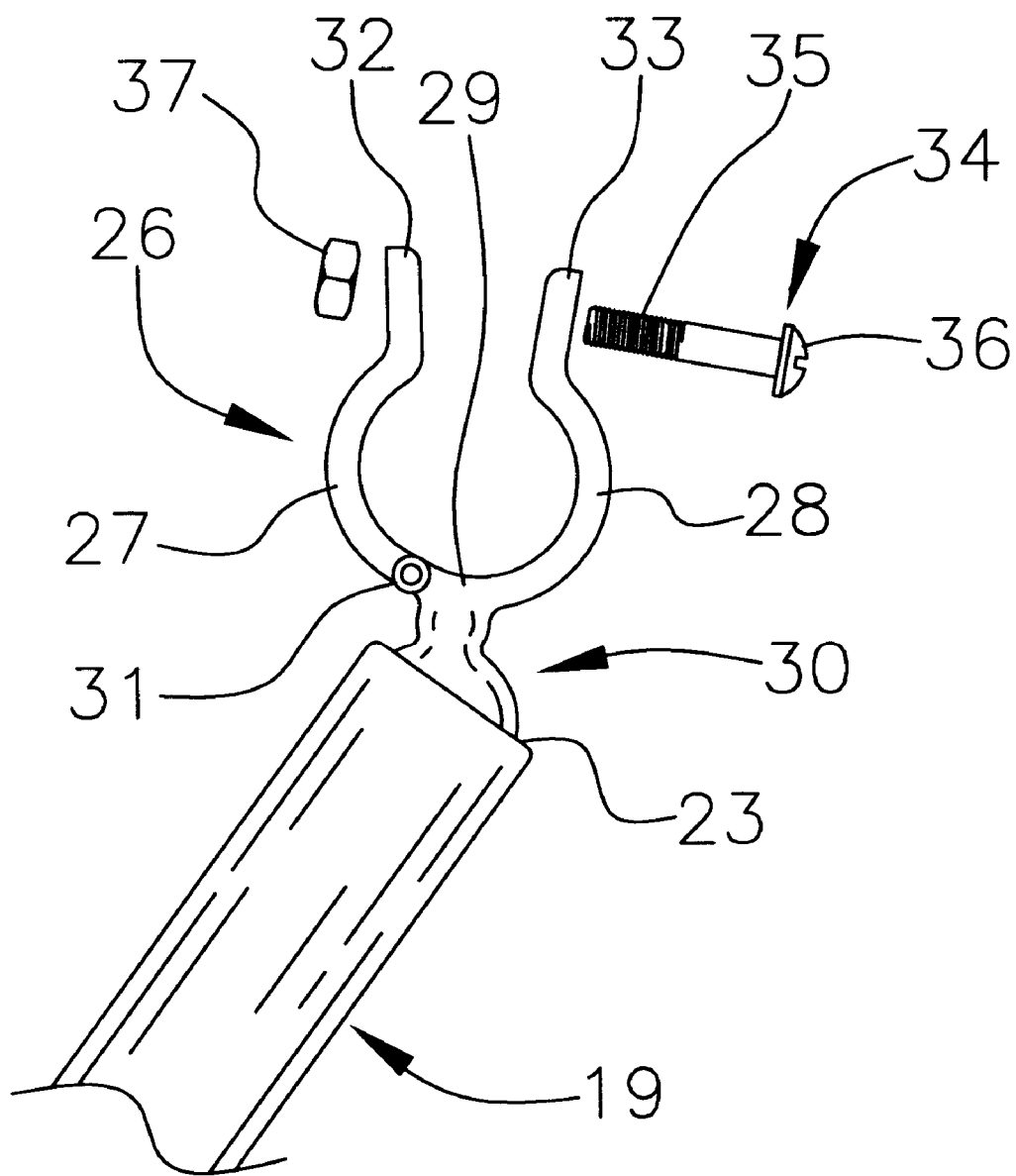
FIG. 2 is a schematic partial side view of the region around clamp member of the present invention.
Figure 3:
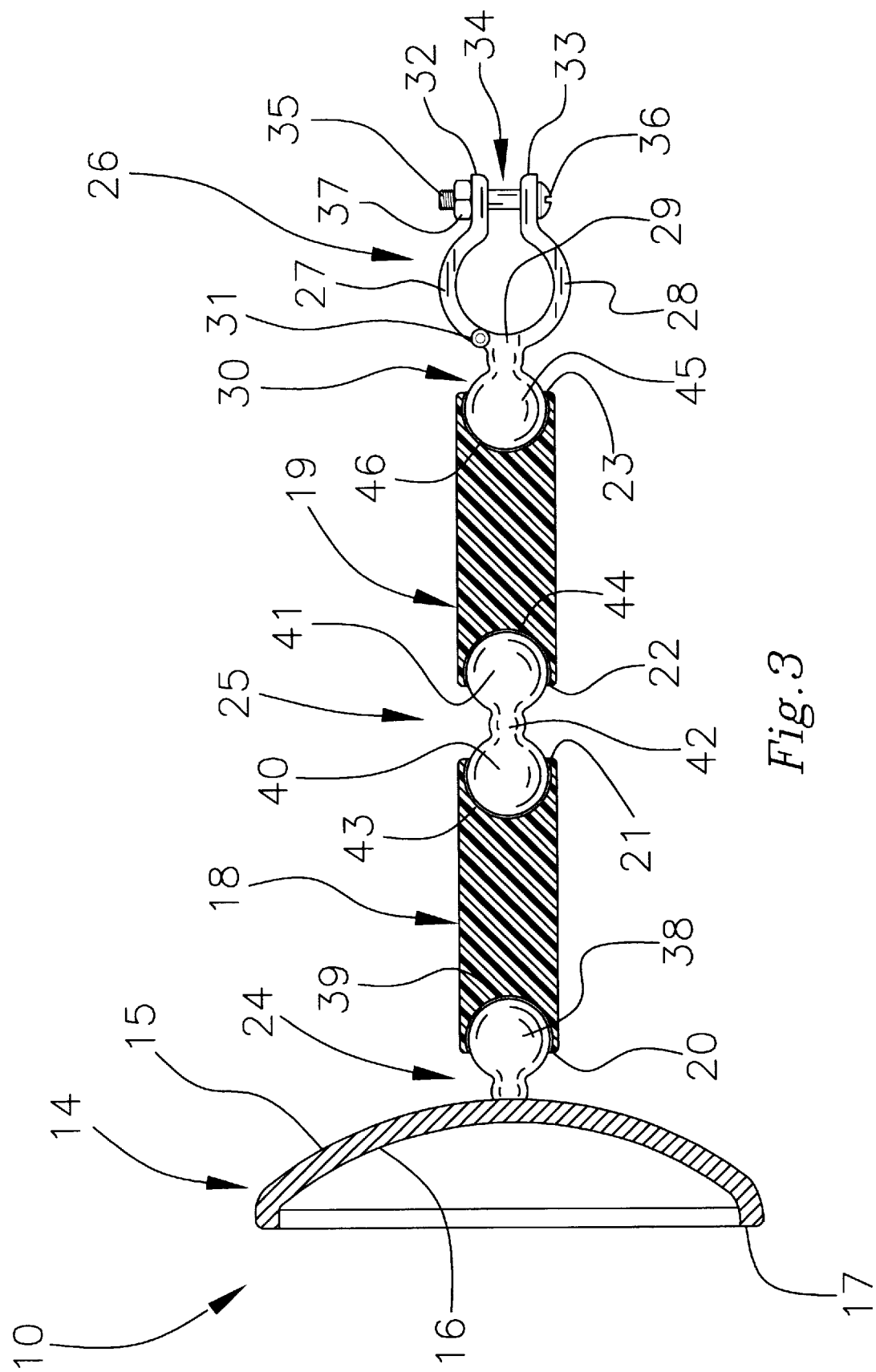
FIG. 3 is a schematic cross sectional view of the present invention.
Figure 4:
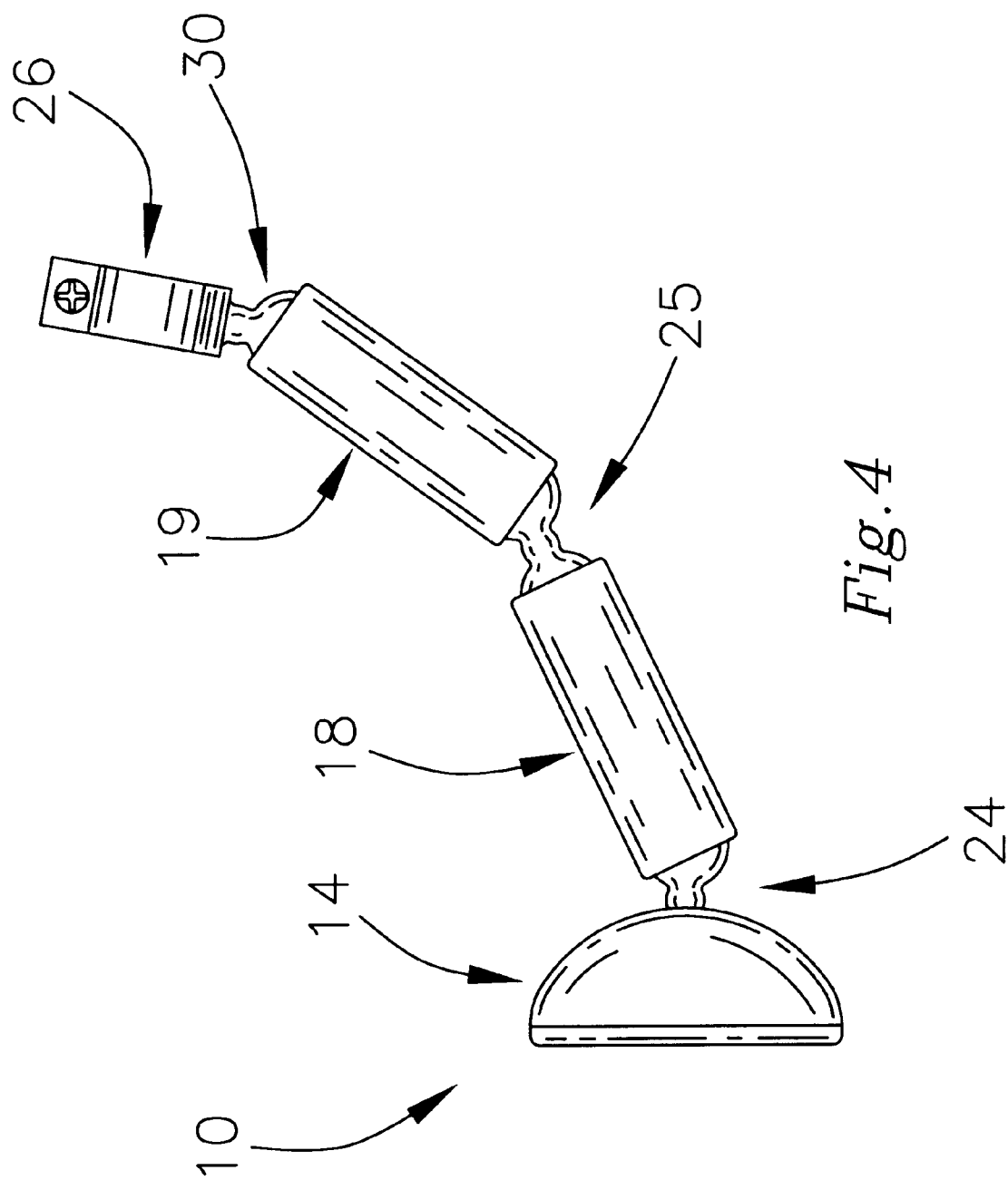
FIG. 4 is a schematic side view of the present invention.

With particular reference to FIGS. 2 and 3, a generally C-shaped clamp member 26 is provided having an opposing pair of generally arcuate resiliently deflectable arms 27,28 which terminate at a pair of opposing ends defining a break therebetween. The clamp member defines a generally circular space with the break providing an opening into the space defined by the clamp member. In the ideal illustrative embodiment, the clamp member has an outer diameter of about 1 inch defined between the middle portion and the break.

The clamp member has a generally arcuate middle portion 29 interposed between the arms of the clamp member opposite the break. A second of the ends 23 of the second shaft is pivotally coupled to the clamp member at the middle portion of the clamp member by a third universal pivot joint 30.

In use, the mounting stem of the rearview mirror is extended through the space of the clamp member such that a portion of the mounting stem is positioned between the arms of the clamp member. Preferably, one of the arms 27 of the clamp member is pivotally coupled by a pivot hinge 31 to the middle portion of the clamp member to permit spreading apart of the end of this arm away from end of the other arm to aid removal of the mounting stem from between the arms of the clamp member.

Each of the ends of the clamp member has a generally rectangular tab 32,33 outwardly extending therefrom in a direction opposite the middle portion of the clamp member. The tabs of the ends of the clamp member preferably lie in generally parallel planes to one another. Each of the tabs of the clamp member has a generally circular hole therethrough that are generally coaxial with one another.

A threaded fastener 34 is extended through the holes of the tabs to couple the tabs together and to hold the mounting stem between the arms of the clamping member. The fastener has an elongate threaded portion 35 and a head portion 36. The threaded portion is extended through the holes of the tab. A threaded nut 37 is threaded onto the threaded portion of the fastener such that the tabs are interposed between the threaded nut and the head portion of the fastener.

In use, the mirror attachment is pivotable at each of the universal pivot joints to permit positioning of the mirrored surface of the mirror member in the position desired by the user to permit viewing of the desired area behind the user. The first universal pivot joint preferably comprises a generally spherical first ball 38 outwardly extending from the front face of the mirror member at the center of the mirror member, and a generally hemispherical first socket 39 in the first end of the first shaft. The first ball is inserted into the first socket to permit universal pivoting of the first ball in the first socket of the first universal socket. Preferably, at least one of the first ball and the first socket of the first universal socket are resilient to permit de-coupling of the first ball and the first socket.

The second universal pivot joint preferably comprises a pivot link having spaced apart generally spherical second and third balls 40,41 and a center portion 42 connecting the second and third balls together. The second universal pivot joint further comprises generally hemispherical second and third sockets 43,44. The second socket 43 is positioned in the second end of the first shaft and the third socket 44 is positioned in the first end of the second shaft. The second ball is inserted into the second socket to permit universal pivoting of the second ball in the second socket of the second universal pivot joint. The third ball is inserted into the third socket to permit universal pivoting of the third ball in the third socket of the second universal pivot joint. As shown in the figures, the center portion (42) of the second universal pivot joint has a pair of opposingly angled faces such that movement of the shafts towards each other causes the respective end of each shaft to abut a respective face of the center portion thereby preventing the shafts from coming into contact and becoming lodged between the second ball joint and the third ball joint of the second universal pivot joint. Preferably, at least one of the second ball and the second socket are resilient to permit de-coupling of the second ball from the second socket. Similarly, at least one of the third ball and the third socket are resilient to permit de-coupling of the third ball from the third socket.

The third universal pivot joint preferably comprises a generally spherical fourth ball 45 outwardly extending from the middle portion of the clamp member in a direction away from the break and a generally hemispherical fourth socket 46 in the second end of the second shaft. The fourth ball is inserted into the fourth socket to permit universal pivoting of the fourth ball of the third universal socket in the fourth socket of the third universal socket. Preferably, at least one of the fourth ball and the fourth socket are resilient to permit de-coupling of the fourth ball and the fourth socket.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A mirror attachment for attachment to a mounting stem of a rearview mirror mounted to a front windshield of a vehicle, said mirror attachment comprising:

a mirror member having a center, arcuate front and back faces, and a peripheral edge;

said back face of said mirror member having a light reflecting mirrored surface;

a pair of generally cylindrical elongate shafts each having a pair of opposite ends and a longitudinal axis extending between said ends of the respective shaft;

a first of said ends of a first of said shafts being pivotally coupled to said front face of said mirror member at said center of said mirror member;

a second of said ends of said first shaft being pivotally coupled to a first of said ends of a second of said shafts;

a clamp member having a pair of arms, said arms of said clamp member terminating at a pair of opposing ends defining a break therebetween, said arms of said clamp member being adapted for holding a portion of a mounting stem of a rearview mirror therebetween to mount said clamp member to the mounting stem of the rearview mirror; and a second of said ends of said second shaft being pivotally coupled to said clamp member at a middle portion of said clamp member located between said arms of said clamp member;

wherein a first universal pivot joint pivotally couples said first end of said first shaft to said front face, wherein a second universal pivot joint pivotally couples said second end of said first shaft to said first end of said second shaft, and wherein a third universal pivot joint pivotally couples said second end of said second shaft to said clamp member at said middle portion of said clamp member;

wherein said first universal pivot joint comprises a generally spherical first ball outwardly extending from said front face of said mirror member at said center of said mirror member, and a generally hemispherical first socket in said first end of said first shaft, said first ball being inserted into said first socket;

wherein said second universal pivot joint comprises a pivot link having spaced apart generally spherical second and third balls and a center portion connecting said second and third balls together, said second universal pivot joint further comprising generally hemispherical second and third sockets, said second socket being positioned in said second end of said first shaft, said third socket being positioned in said first end of said second shaft, said second ball being inserted into said second socket, and said third ball being inserted into said third socket; and wherein said center portion of said second universal pivot joint has a pair of opposingly angled faces such that movement of said shafts towards each other causes the respective ends of said shafts to abut a respective face of said center portion thereby preventing said shafts from coming into contact and becoming lodged between said second ball and said third ball of said second universal pivot joint.

2. The mirror attachment of claim 1, wherein said front face of said mirror member is generally convex in shape, and wherein said back face of said mirror member is generally concave in shape.

3. The mirror attachment of claim 1, wherein said peripheral edge of said mirror member is generally circular in shape.

4. The mirror attachment of claim 1, wherein said peripheral edge of said mirror member is generally oval in shape.

5. The mirror attachment of claim 1, wherein said third universal pivot joint comprises a generally spherical fourth ball outwardly extending from said middle portion of said clamp member in a direction away from said break, and a generally hemispherical fourth socket in said second end of said second shaft, said fourth ball being inserted into said fourth socket.

6. The mirror attachment of claim 5, wherein at least one of said first ball and said first socket of said first universal socket are resilient to permit de-coupling of said first ball and said first socket, wherein at least one of said second ball and said second socket are resilient to permit de-coupling of said second ball from said second socket, wherein at least one of said third ball and said third socket are resilient to permit de-coupling of said third ball from said third socket, and wherein at least one of said fourth ball and said fourth socket are resilient to permit de-coupling of said fourth ball and said fourth socket.

7. The mirror attachment of claim 1, wherein one of said arms of said clamp member is pivotally coupled to said middle portion of said clamp member.

8. A mirror attachment system, comprising:

a rearview mirror of a vehicle mounted to a front windshield of the vehicle to permit viewing by the driver of an area behind the vehicle, the rearview mirror comprising a generally rectangular mirrored portion pivotally coupled to a mounting stem, the mounting stem being attached to an inside surface of the front windshield;

a mirror attachment, comprising:

a generally dome-shaped mirror member having a center, arcuate front and back faces, and a peripheral edge;

said front face of said mirror member being generally convex in shape;

said back face of said mirror member being generally concave in shape;

said back face of said mirror member having a concave light reflecting mirrored surface to permit viewing of a reflected image by a user looking at said back face of said mirror member;

wherein said peripheral edge of said mirror member is generally oval in shape;

wherein said mirror member has a depth defined between said plane of said peripheral edge and said front face at said center of said mirror member, wherein said depth of said mirror member is about 1 inch;

a pair of generally cylindrical elongate shafts each having a pair of opposite ends and a longitudinal axis extending between said ends of the respective shaft, wherein said lengths of said shafts are each about 2 inches;

said shafts each having a length defined between said ends of the respective member, wherein said lengths of said shafts are about equal to one another;

a first of said ends of a first of said shafts being pivotally coupled to said front face of said mirror member at said center of said mirror member, wherein a first universal pivot joint pivotally couples said first end of said first shaft to said front face;

a second of said ends of said first shaft being pivotally coupled to a first of said ends of a second of said shafts, wherein a second universal pivot joint pivotally couples said second end of said first shaft to said first end of said second shaft;

a generally C-shaped clamp member having a pair of generally arcuate resilient arms, said arms of said clamp member terminating at a pair of opposing ends defining a break therebetween;

wherein said clamp member has an outer diameter of about 1 inch defined between said middle portion and said break;

said clamp member defining a generally circular space, said break providing an opening into said space defined by said clamp member;

said clamp member having a generally arcuate middle portion interposed between said arms of said clamp member opposite said break;

a second of said ends of said second shaft being pivotally coupled to said clamp member at said middle portion of said clamp member, wherein a third universal pivot joint pivotally couples said second end of said second shaft to said clamp member at said middle portion of said clamp member;

the mounting stem being extended through said space of said clamp member such that a portion of the mounting stem is positioned between said arms of said clamp member;

one of said arms of said clamp member being pivotally coupled to said middle portion of said clamp member to permit spreading apart said end of said arm away from said end of said other arm for aiding removal of the mounting stem from between said arms of said clamp member;

each of said ends of said clamp member having a generally rectangular tab outwardly extending therefrom in a direction opposite said middle portion of said clamp member, said tabs of said ends of said clamp member lying in generally parallel planes to one another;

each of said tabs of said clamp member having a generally circular hole therethrough, said holes of said tabs being generally coaxial with one another;

a fastener being extended through said holes of said tabs to couple said tabs together and to hold said mounting stem between said arms of said clamping member;

said fastener having a threaded portion and a head portion, said threaded portion being extended through said holes of said tab;

a threaded nut being threaded onto said threaded portion of said fastener such that said tabs are interposed between said threaded nut and said head portion of said fastener;

wherein said mirror attachment is pivotable at each of said universal joints to permit positioning of said mirrored surface of said mirror member in the position desired by the user to permit viewing of the desired area behind the user;

said first universal pivot joint comprising a generally spherical first ball outwardly extending from said front face of said mirror member at said center of said mirror member, and a generally hemispherical first socket in said first end of said first shaft;

said first ball being inserted into said first socket to permit universal pivoting of said first ball in said first socket of said first universal socket;

wherein at least one of said first ball and said first socket of said first universal socket are resilient to permit de-coupling of said first ball and said first socket;

said second universal pivot joint comprising a pivot link having spaced apart generally spherical second and third balls and a center portion connecting said second and third balls together;

said second universal pivot joint further comprising generally hemispherical second and third sockets, said second socket being positioned in said second end of said first shaft, said third socket being positioned in said first end of said second shaft;

said second ball being inserted into said second socket to permit universal pivoting of said second ball in said second socket of said second universal pivot joint;

said third ball being inserted into said third socket to permit universal pivoting of said third ball in said third socket of said second universal pivot joint;

wherein at least one of said second ball and said second socket are resilient to permit de-coupling of said second ball from said second socket, wherein at least one of said third ball and said third socket are resilient to permit de-coupling of said third ball from said third socket;

said third universal pivot joint comprising a generally spherical fourth ball outwardly extending from said middle portion of said clamp member in a direction away from said break, and a generally hemispherical fourth socket in said second end of said second shaft;

said fourth ball being inserted into said fourth socket to permit universal pivoting of said fourth ball of said third universal pivot joint in said fourth socket of said third universal pivot joint;

wherein at least one of said fourth ball and said fourth socket are resilient to permit de-coupling of said fourth ball and said fourth socket; and wherein said center portion of said second universal pivot joint has a pair of opposingly angled faces such that movement of said shafts towards each other causes the respective ends of said shafts to abut a respective face of said center portion thereby preventing said shafts from coming into contact and becoming lodged between said second ball and said third ball of said second universal pivot joint.

\* \* \* \* \*